(12) United States Patent
Graves et al.

(10) Patent No.: US 8,407,088 B2
(45) Date of Patent: *Mar. 26, 2013

(54) REBATE CARD SYSTEM

(75) Inventors: Phillip Craig Graves, Atlanta, GA (US);
Phil M. Chakiris, Atlanta, GA (US);
Karl Denzer, Denver, CO (US); Dustin Young, Denver, CO (US)

(73) Assignee: e2interactive, Inc.

( * ) Notice: Subject to any disclaimer, the term of this patent is extended or adjusted under 35 U.S.C. 154(b) by 11 days.

This patent is subject to a terminal disclaimer.

(21) Appl. No.: 12/804,714

(22) Filed: Jul. 28, 2010

(65) Prior Publication Data

US 2010/0299196 A1 Nov. 25, 2010

Related U.S. Application Data

(63) Continuation of application No. 11/303,258, filed on Dec. 16, 2005.

(51) Int. Cl.
*G06Q 30/00* (2012.01)

(52) U.S. Cl. .................. 705/14.34; 705/14.1; 705/14.3; 705/39

(58) Field of Classification Search .................. 705/14.1, 705/14.34, 14.3, 39
See application file for complete search history.

(56) References Cited

U.S. PATENT DOCUMENTS

| | | | |
|---|---|---|---|
| 5,117,355 A | 5/1992 | McCarthy | |
| 5,202,826 A | 4/1993 | McCarthy | |
| 5,577,109 A | 11/1996 | Stimson | |
| 5,806,045 A | 9/1998 | Biorge | |
| 5,870,724 A | 2/1999 | Lawlor | |
| 5,903,874 A | 5/1999 | Leonard | |
| 5,956,695 A | 9/1999 | Carrithers | |
| 6,000,608 A | 12/1999 | Dorf | |
| 6,032,135 A | 2/2000 | Moland | |
| 6,070,147 A | 5/2000 | Harms | |
| 6,129,276 A | 10/2000 | Jelen | |
| 6,167,387 A | 12/2000 | Lee-Wai-Yin | |
| 6,199,757 B1 | 3/2001 | Kubert | |
| 6,256,690 B1 | 7/2001 | Carper | |
| 6,302,326 B1 | 10/2001 | Symonds | |
| 6,330,544 B1 | 12/2001 | Walker | |
| 6,386,591 B1 | 5/2002 | Blank | |
| 6,422,462 B1 | 7/2002 | Cohen | |
| 6,450,407 B1 * | 9/2002 | Freeman et al. | 235/492 |
| 6,507,644 B1 | 1/2003 | Henderson | |
| 6,575,361 B1 | 6/2003 | Graves | |
| 6,594,640 B1 | 7/2003 | Postrel | |
| 6,615,189 B1 | 9/2003 | Phillips | |

(Continued)

FOREIGN PATENT DOCUMENTS

WO WO2005036432 * 4/2005

OTHER PUBLICATIONS

Carow et al, "Plastic Choices: consumer usage of Bank Cards vs. Proprietary Credit Cards", Apr. 2000, Indiana University, kelley School of Business, pp. 1-30.*

*Primary Examiner* — John Van Bramer
(74) *Attorney, Agent, or Firm* — Landmark Intellectual Property Law, PC (57) ABSTRACT

A method and system for using a rebate card are disclosed. The method may comprise initiating a purchase transaction for one or more products at a point of sale, determining whether the purchase transaction qualifies for a rebate, determining a rebate value based on the purchase transaction and the rebate, activating a rebate value in a rebate card account associated with a rebate card based on the determining action, and delivering the rebate card to a customer of the one or more products during the purchase transaction.

11 Claims, 5 Drawing Sheets

U.S. PATENT DOCUMENTS

| | | |
|---|---|---|
| 6,615,190 B1 | 9/2003 | Slater |
| 6,623,039 B2 | 9/2003 | Thompson |
| 6,648,222 B2 | 11/2003 | McDonald |
| 6,651,885 B1 | 11/2003 | Arias |
| 6,659,259 B2 | 12/2003 | Knox |
| 6,748,365 B1 | 6/2004 | Quinlan |
| 6,805,289 B2 | 10/2004 | Noriega |
| 6,827,260 B2 | 12/2004 | Stoutenburg |
| 6,837,426 B2 | 1/2005 | Tidball |
| 6,847,935 B1 | 1/2005 | Solomon |
| 6,865,544 B1 | 3/2005 | Austin |
| 7,072,864 B2 | 7/2006 | Brake |
| 7,090,138 B2 | 8/2006 | Rettenmeyer |
| 7,269,256 B2 | 9/2007 | Rosen |
| 7,311,249 B2 | 12/2007 | Smith |
| 7,398,248 B2 * | 7/2008 | Phillips et al. ............... 705/39 |
| 2001/0001856 A1 | 5/2001 | Gould |
| 2002/0022966 A1 | 2/2002 | Horgan |
| 2002/0161631 A1 | 10/2002 | Banertee |
| 2003/0078835 A1 | 4/2003 | Plutchinske |
| 2003/0083930 A1 | 5/2003 | Burke |
| 2003/0135462 A1 | 7/2003 | Brake |
| 2003/0154163 A1 | 8/2003 | Phillips |
| 2003/0174823 A1 | 9/2003 | Justice |
| 2003/0200144 A1 | 10/2003 | Antonucci |
| 2003/0200179 A1 | 10/2003 | Kwan |
| 2003/0204441 A1 | 10/2003 | Ellis |
| 2003/0236704 A1 | 12/2003 | Antonucci |
| 2004/0054587 A1 | 3/2004 | Dev |
| 2004/0064412 A1 | 4/2004 | Phillips |
| 2004/0133511 A1 | 7/2004 | Smith |
| 2004/0167821 A1 * | 8/2004 | Baumgartner ............... 705/17 |
| 2004/0181453 A1 | 9/2004 | Ray |
| 2004/0205023 A1 | 10/2004 | Hafer |
| 2004/0267663 A1 | 12/2004 | Karns |
| 2005/0001027 A1 | 1/2005 | Bahar |
| 2005/0021400 A1 | 1/2005 | Postrel |
| 2005/0027655 A1 | 2/2005 | Sharma |
| 2005/0051619 A1 | 3/2005 | Graves |
| 2005/0125292 A1 * | 6/2005 | Kassab et al. ............... 705/14 |
| 2005/0127169 A1 | 6/2005 | Foss |
| 2005/0143051 A1 | 6/2005 | Park |
| 2005/0149387 A1 | 7/2005 | O'Shea |
| 2005/0182678 A1 | 8/2005 | Walker |
| 2005/0228717 A1 | 10/2005 | Gusler |
| 2005/0240472 A1 | 10/2005 | Postrel |
| 2005/0240473 A1 | 10/2005 | Ayers |
| 2005/0263587 A1 | 12/2005 | Martinez |
| 2006/0053056 A1 | 3/2006 | Aispach-Goss |
| 2006/0113376 A1 | 6/2006 | Reed |
| 2006/0129456 A1 | 6/2006 | Walker |
| 2006/0136299 A1 | 6/2006 | Ruhmkorf |
| 2006/0163347 A1 | 7/2006 | Foss, Jr. et al. |
| 2006/0190337 A1 | 8/2006 | Ayers |
| 2006/0195359 A1 | 8/2006 | Robinson |
| 2006/0207856 A1 | 9/2006 | Dean |
| 2006/0213985 A1 | 9/2006 | Walker |
| 2006/0229937 A1 | 10/2006 | Manley |
| 2007/0083460 A1 | 4/2007 | Bachenheimer |

* cited by examiner

REBATE CARD SYSTEM

CROSS-REFERENCE TO RELATED APPLICATION

The present application is a continuation of U.S. patent application Ser. No. 11/303,258, filed Dec. 16, 2005, which is incorporated herein by reference in its entirety.

BACKGROUND OF THE INVENTION

Traditionally systems and methods of obtaining a rebate require purchasers to mail a rebate application to the manufacturer (or agent thereof) along with a receipt and/or other proof of purchase, such as a UPC (Uniform Product Code) from the package of a purchased product. If the rebate application is approved, a check is mailed to the purchaser. Application review often takes around ninety days, and rebate applications are often denied if there is some formal defect in the application. The rebate attracts customers by effectively lowering the price of an item after rebate, much like a "sale price" attracts shoppers. While enjoying increased sales, merchants also avoid the costs of the rebate when many customers fail to complete and mail the rebate application or else submit a faulty application that is denied the rebate.

However, the conventional rebate redemption process involves significant time and energy costs on the part of the customer to redeem the rebate check, which is often relatively small compared to the opportunity cost of the customer's time. The not-insignificant possibility of rebate denial renders the rebate's benefits more speculative, further reducing the rebate's perceived value to the customer and its incentive effect. The perceived benefit is further diminished because of the well-known processing delays, which also tend to dissociate the rebate's value from the regular purchase price.

SUMMARY OF THE INVENTION

The present invention discloses a method and system for using a rebate card. In some embodiments, the method may comprise initiating a purchase transaction, determining whether the purchase is rebate eligible, determining a rebate value based on the purchase, activating a rebate value in a rebate card account associated with a rebate card, and delivering the rebate card to a customer during the purchase transaction.

In some embodiments of the Rebate Card System of the present invention, the purchaser of a rebate-eligible product may be provided a rebate card by the retailer. The rebate card may have an associated value that may be used for subsequent purchases from only that particular retailer, or alternatively from any retailer, and the rebate card may act like a debit card. The activation of the rebate card may be governed by the purchaser having fulfilled required commitments, such as not returning the product for a specified period or by purchasing a related product or service. The value associated to the rebate card may be fixed, or may vary based on criteria defined by the retailer or manufacturer. Value beyond the initial rebate may be associated with the rebate card based on additional product purchases or other factors defined by the retailer or manufacturer. Further, any future transactions with the rebate card may be associated with the initial rebate transaction. This associated data may be shared with the manufacturer and retailer.

In some embodiments in accordance with the present invention, the Rebate Card System is intended to facilitate the payment of manufacturer or vendor rebates associated with the purchase of particular products. Traditionally, a product purchaser wanting to obtain such a rebate must mail a coupon to the manufacturer (or a contracted representative) along with proof of purchase such as a receipt and/or UPC code from the product package. Products may be goods and/or services.

In some embodiments in accordance with the present invention of the Rebate Card System, the purchaser of a rebate-eligible product may be provided a rebate card by the retailer. The rebate card may have an associated value that may be used for subsequent purchases from only that particular retailer, or alternately from any retailer like a debit card. The activation of the rebate card may be governed by the purchaser having fulfilled required commitments, such as not returning the product for a specified period or by purchasing a related product or service. The value associated to the rebate card may be fixed, or may vary based on some metrics that the retailer or manufacturer may choose to define. Value beyond the initial rebate may be associated with the rebate card should the retailer or the manufacturer wish to do so.

The rebate cards themselves may be similar to other prepaid cards. A typical rebate card may have a unique identifier that may be included along with other information on a magnetic strip. The rebate card may also have a bar code containing a unique identifier, which may help input the information into retailer systems. Rebate cards may be provided to the retailer by a central card processor in an inactive state. Alternately, the rebate card may be attached to or inside of, the manufacturer's package.

The rebate card may be presented to the purchaser at the time of purchase of a rebate-eligible product, or may be sent to the purchaser at a later time. The card may be active when received by the purchaser, or may be activated at a later time. An activation request may be sent from a retailer terminal to the central processor. The activation request may include information on the product being purchased. The central processor may verify that the request is being received from an authorized location and that the purchase of the product entitles the purchaser to a rebate, which may comprise communication with the product vendor. The central processor may also verify that the purchaser has fulfilled required obligations that the retailer or manufacturer has linked to activation of the rebate. The central processor may then activate the rebate card by setting a value for the card in a database record associated with the card. The value associated to the card by the central processor may vary based on criteria established by the retailer or manufacturer. The central processor also may send a confirmation message to the retailer terminal.

Linking the activation of the rebate and the rebate value to criteria managed and tracked by the central processor is very valuable to the retailer, manufacturer and purchaser as it (i) mitigates fraud typically associated with the distribution of traditional debit cards; (ii) reduces the significant manual effort required of retailers and purchasers in the current rebate process; (iii) reduces the time required to process a rebate; and (iv) increases the credibility of rebate offers, the traditional model of which has come under recent legal pressure.

Once activated, the rebate card may then be used for additional purchases up to the value associated with the card, or for greater values if the purchaser makes up the difference in value. As purchases are made, the value associated with the card is reduced, and additional purchase data may be associated with the initial transaction.

When a rebate request is validated and a rebate value is associated with a rebate card account, the central processor may transmit information to the vendor, manufacturer and/or other rebate guarantor and request payment for the rebate.

The amount of the rebate may immediately be turned over to the retailer or may be held by the central processor and paid to the retailer upon redemption of the rebate card value.

In some embodiments in accordance with the present invention, the rebate cards are not pre-associated with a particular product or value, but may have unique identification indicia. In some embodiments, an already active rebate card held by a purchaser may have value added to it based on criteria defined by the retailer or manufacturer. In some embodiments, additional actions must be completed by the purchaser before the rebate card is activated. For example, the purchaser may be required to visit a vendor website and answer a questionnaire. Upon completion of the additional action, the central processor is notified that the rebate card should be activated.

In some embodiments in accordance with the present invention, the rebate card may be used to gain additional associated data. Generally, the manufacturer (or vendor) offering the rebate receives limited data from the customer: the receipt, the UPC label, and the name and address of the customer. Using a uniquely identified rebate card may allow later transactions made with the uniquely identified rebate card to be associated with the initial sale transaction. This type of associated consumer behavior information may be very valuable in marketing, and often cannot be gained by other standard rebate systems.

For example, if the customer purchases a computer, then it is possible that the rebate card will be used for later computer related purchases. Perhaps a manufacturer learns that computer purchasers tend to buy larger monitors one month after the initial purchase of a computer. The manufacturer can then use that information to increase sales of monitors by targeting computer purchasers with coupons or rebates for large computer monitors approximately one month after the initial purchase of a computer.

The following U.S. Patents describe the state of the art regarding cards, rebates, and incentive systems, and are incorporated by reference: U.S. Pat. Nos. 5,117,355, 5,202,826, 5,777,305, 5,806,045, 6,330,544, 6,847,935, 6,865,544, 6,865,544 and 6,918,537.

The following U.S. Patent Application Publications are also incorporated by reference: 2001/0001856, 2003/0004737, 2004/0064412, 2005/0021400, 2004/013351, 2004/0153402, 2003/0172031, 2005/0051619, 2005/0017502, 2005/0060248, 2004/0129777, 2004/0118914, and 2004/0195316.

These and other aspects will become apparent from the following description of the preferred embodiment taken in conjunction with the following drawings, although variations and modifications may be effected without departing from the spirit and scope of the novel concepts of the disclosure.

BRIEF DESCRIPTION OF THE DRAWINGS

The present invention can be more fully understood by reading the following detailed description together with the accompanying drawings, in which like reference indicators are used to designate like elements.

DETAILED DESCRIPTION OF EXEMPLARY EMBODIMENTS

Hereinafter, various embodiments of the invention will be described. As used herein, any term in the singular may be interpreted in the plural, and alternately, any term in the plural may be interpreted to be in the singular.

Further, the term "products" refers to products or services. The terms "manufacturer" and "retailer" also include service providers. The term "purchase" also includes renting.

The term "card" is defined broadly as including, but not limited to, plastic cards with identification indicia (such as embossed numbers, coded magnetic strip, embedded electronic chip, optical code like bar codes, and other indicia known in the art). The term "card" also includes information storage devices which are not physically shaped like cards, such as memory strips, USB (Uniform Serial Bus) flash drives, and so forth.

Figure 1:
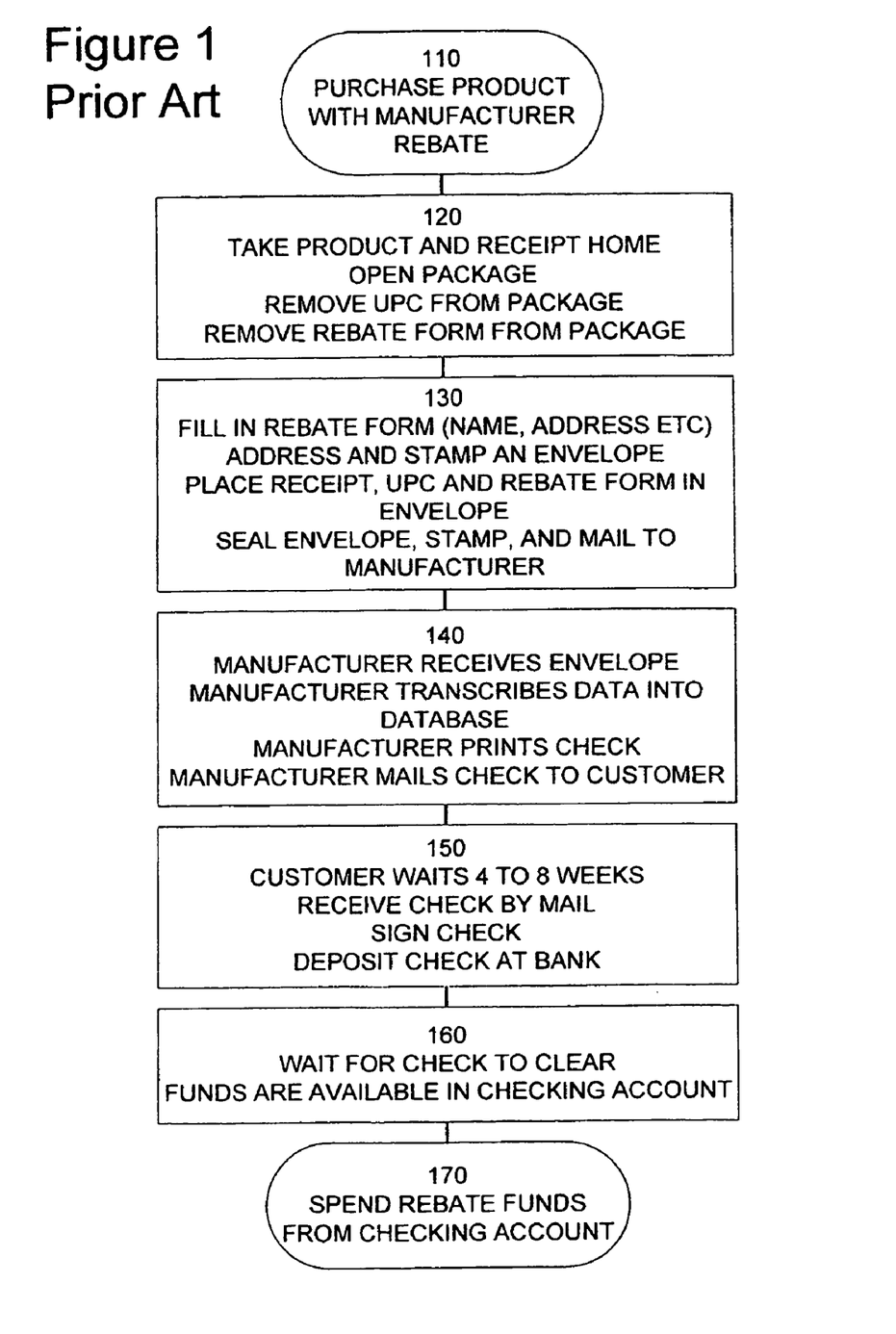
FIG. 1 displays prior art for purchasing a product with a manufacturer's rebate.

FIG. 1 is prior art showing a typical process for getting a manufacturer rebate. In block 110, the customer purchases a product with a manufacturer rebate.

In block 120, the customer takes the product home, opens the package, removes the UPC from the package, and removes the rebate form from the package. Alternately, the rebate form may be supplied by the retailer.

In block 130, the customer (generally by hand) fills in the rebate form, addresses and stamps an envelope, places the receipt and UPC and rebate form in the envelope, then stamps and mails the envelope.

In block 140, the manufacturer (or a processing company) receives the envelope, transcribes the handwritten customer data (name and address at a minimum), prints a check and mails the check to the customer. Generally the check is printed and mailed as part of a folded sheet with tear away edges. Coupons may comprise part of the envelope.

In block 150, the customer generally waits 4 to 8 weeks for the check, then deposits the check in a bank.

In block 160, the customer waits for the check to clear and the funds to become available.

In block 170, the customer spends the rebate funds from the bank account. Note that the rebate funds are cash that may be spent anywhere, and that the manufacturer has no knowledge of how these funds are spent.

Figure 2:
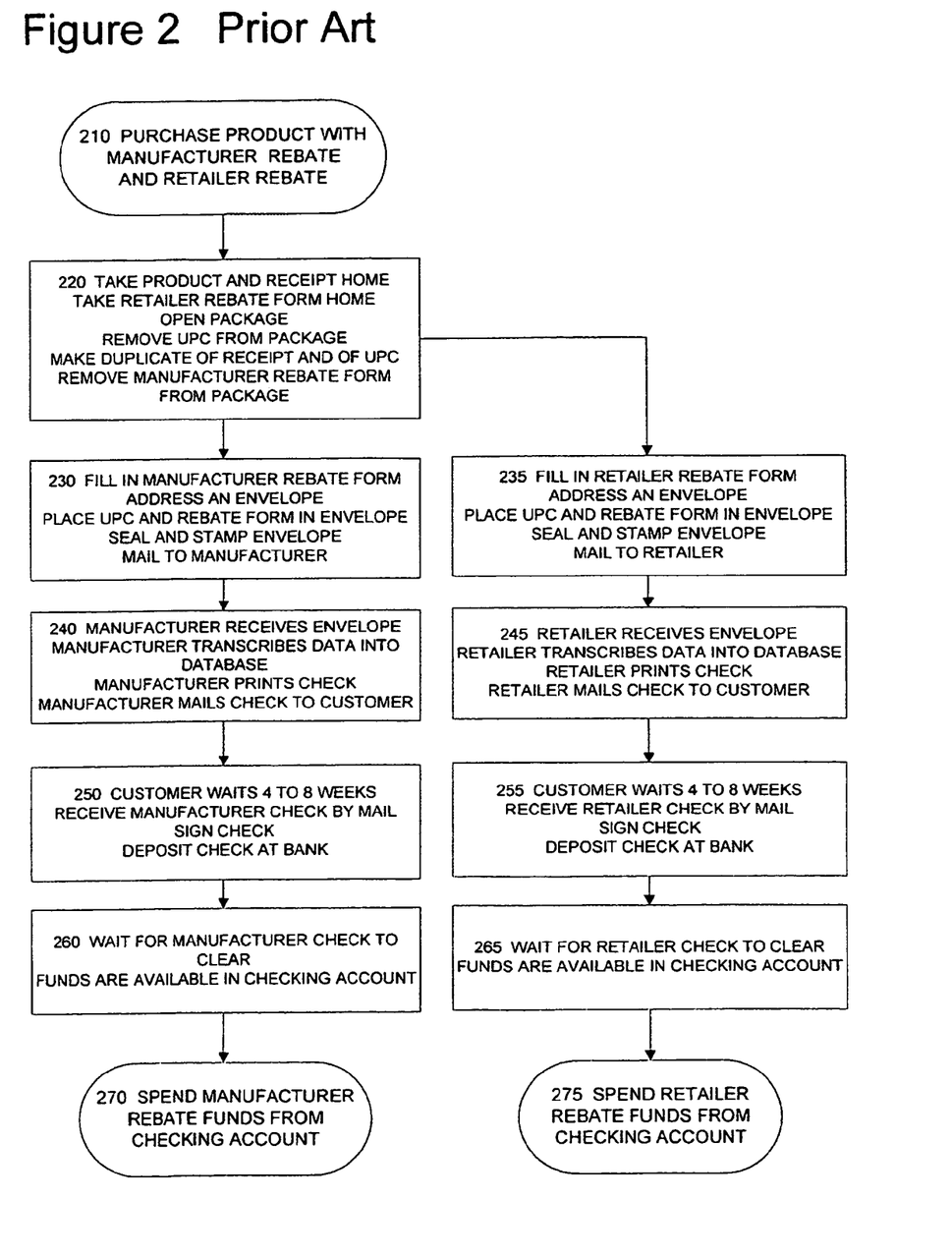
FIG. 2 displays prior art for purchasing a product with a manufacturer's rebate and a retailer's rebate.

FIG. 2 is prior art showing a typical process for getting a manufacturer rebate and a retailer rebate from a single product purchase. This process is very unwieldy, time consuming, and expensive.

Blocks 210, 220, 230, 240, 250, 260, and 270 are similar to blocks 110-170 of FIG. 1 above, except that a duplicate of the receipt and of the UPC must be made at block 220. Additionally, there is a parallel path for processing and spending the retailer rebate which comprises blocks 235, 245, 255, 265, and 275.

Note that FIG. 2 comprises four separate mailings: an envelope to the manufacturer, an envelope to the retailer, an envelope from the manufacturer, and an envelope from the retailer. Further note that the parallel paths indicate an inefficient duplication of labor at each paralleled step.

Figure 3:
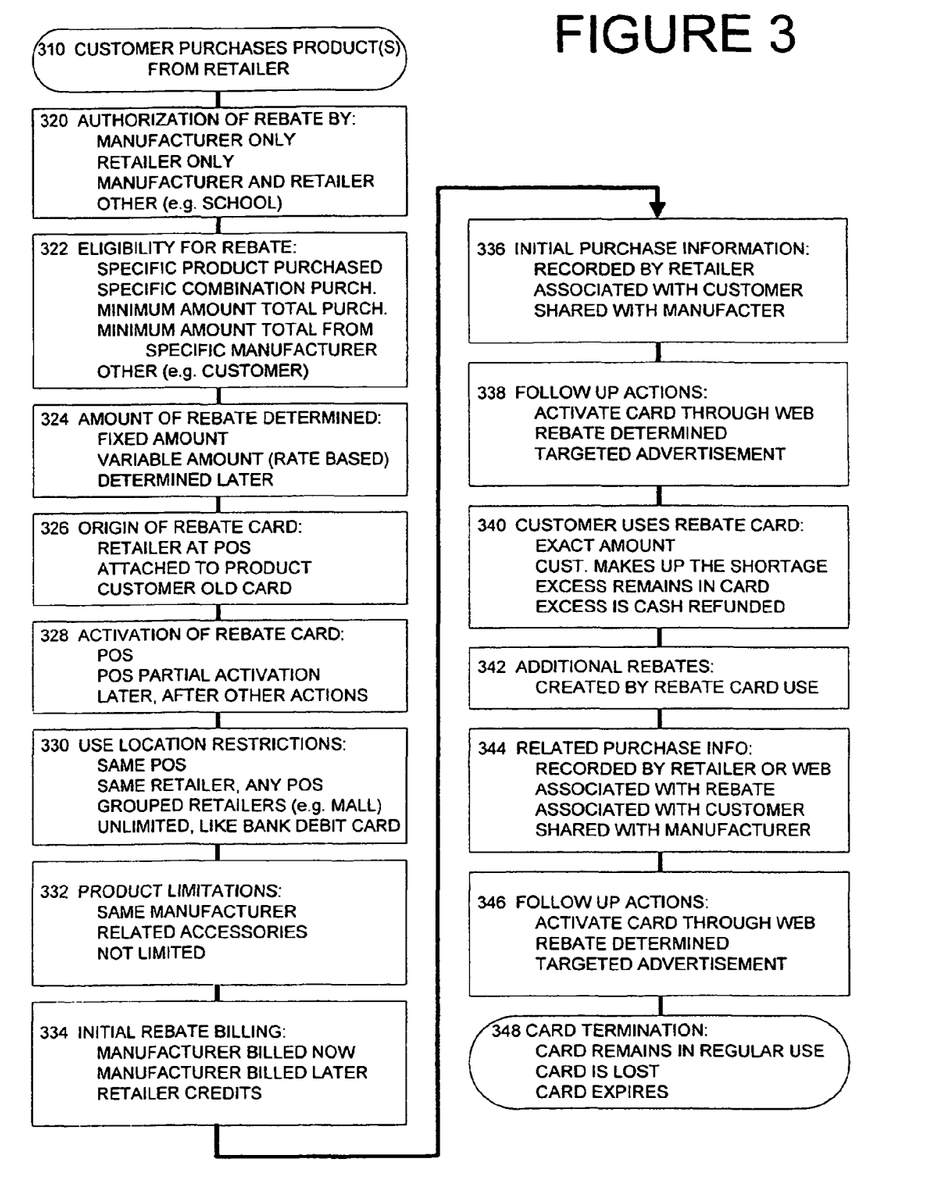
FIG. 3 displays a broad view of many factors of the present invention. Embodiments may comprise various combinations of some or all of these factors.

FIG. 3 displays a broad view of many factors of the present invention. Embodiments may comprise various combinations of some or all of these factors.

In block 310, the customer purchases one or more products from a retailer.

In block 320, the rebate may be authorized by one or more various parties, including but not limited to:
- the manufacturer only;
- the retailer only;
- the manufacturer and the retailer; or
- other parties such as a school for school supplies.

In block 322, eligibility for a rebate may be determined based upon various factors, including but not limited to:
- a specific product is purchased;
- a specific combination of products is purchased;
- a minimum amount of total value is purchased;
- a minimum amount of total value from a specific manufacturer is purchased; or
- other (e.g. the customer identity or class, or not returning the product for a certain period of time).

In block 324, the amount of rebate may be determined based upon various factors, including but not limited to:
- a fixed amount associated with the eligible product;
- a variable amount (rate based) dependent upon the value of the eligible product or products; or
- an amount to be determined later, dependent upon customer actions such as filling out a questionnaire and making selections.

In block 326, the rebate card may be given to the customer by the retailer at the point of sale, may be attached to the product, or may be an old rebate card that the customer has in his hand.

In block 328, the rebate card may be activated at the point of sale, may be activated to a portion of the maximum rebate at the point of sale (the remainder being associated with the card after certain conditions are satisfied), or may not be activated until certain conditions (such as filling out a questionnaire, purchasing a related product, or not returning a product for a specified period) are satisfied.

In block 330, the use of the card may be restricted to certain locations, including but not limited to:
- the same exact point of sale (Retailer A, at street B, in city D, in state E);
- the same retailer (Retailer A, at any location);
- some group of retailers (e.g., all the retailers at a certain mall); or
- unlimited use, like a bank debit card.

In block 332, the use of the card may be restricted to certain products: products from the same manufacturer, accessories related to the initial purchase (e.g. a monitor for the initially purchased computer), or no product restrictions.

In block 334, the initial rebate billing procedure may include but is not limited to:
- the manufacturer is billed when the customer initiates the purchase, and must pay the retailer before the rebate card is activated;
- the manufacturer is billed when the customer initiates the purchase, and must pay the a third party before the rebate card is activated (in this case, the third party will pay the retailer only if and when the rebate card is used, and any unused value may be refunded if the card is not fully used and becomes void after perhaps one year);
- the card is activated, and the rebate amount is credited to or associated with the card account;
- the manufacturer is billed after the card is activated, and must pay the retailer or a third party immediately or within a commercially reasonable length of time;
- the manufacturer is billed when the rebate card is used, and must pay the used amount before the transaction is completed; or
- the manufacturer is billed when the rebate card is used, and must pay immediately or within a reasonable length of time.

In block 336, the initial purchase transaction information may comprise the product eligible for rebate, the amount of rebate, the point of sale, the date, other products purchased simultaneously, and customer data such as name and address if purchased using a retailer credit card or general credit or debit card. The initial transaction information may be recorded by the retailer or the central processor, may be associated with the customer in a customer database, and may be shared with the manufacturer.

In block 338, additional follow up actions may occur after the initial transaction, including but not limited to:
- the customer may activate an unactivated card by visiting a website (or by telephone) and providing information such as name and address;
- the rebate amount may be determined based upon how much information the customer supplies or other factors (for example, name and address may earn a minimum rebate, but providing an e-mail address and completing a 30 part questionnaire may gain a maximum rebate);
- the rebate amount may be determined by customer selection (for example, the rebate amount may be minimum for a general usage rebate, may be intermediate for a rebate from the same retailer or the same manufacturer, but may be maximum for purchasing products from the same retailer and the same manufacturer);
- alternately or simultaneously, the value of the rebate may decline over time, or
- the retailer or the manufacturer may send targeted advertisements such as sales or coupons by mail or by email.

In block 340, the customer uses the rebate card for an additional purchase. If the additional purchase:
- equals the value of the card, then the card is zeroed;
- is greater than the value of the card, then the customer must make up the shortage with cash or with check or with credit;
- is less than the value of the card, then the value is decreased and some value remains with the card (if the value is nominal, perhaps under $5, then the nominal value may be returned to the customer as cash and the card zeroed); or
- is less than the value of the card, then any remaining value is returned to the customer as cash (in this way, a rebate card would only be used for one purchase transaction, and would never be reused).

A zeroed card may be closed out like a zeroed bank account, or may be left open for some length of time in case the customer receives another rebate and wishes to reuse the zeroed card. However, a customer may not want to carry a card with zero value, unless some additional motivation is provided to reuse the card (such as an increased rebate for reused cards).

In block 342, additional rebates may be generated by the customer when he uses the rebate card to purchase additional products that are eligible for rebates. The additional rebates may be credited to the old rebate card, or a new rebate card may be generated. Further, bonus rebates or a higher rebate rate may be provided to the customer when a rebate card is used to purchase additional products that are also eligible for rebates.

In block 344, there may be substantial information generated during the use of a rebate card for an additional purchase, for example: product identification, rebate amount, other products purchased at same time, date of sale, location of sale, identity of customer, and other data associated with customer.

This purchase information may be:
recorded by the retailer, or central processor, or website;
associated with the earlier rebate generating transaction;
associated with the card;
associated with the customer; and
shared with the manufacturer.

Additionally, later transactions with the rebate card may be similarly recorded, associated, shared, and associated with the initial transaction. These later transactions generate related information which is unavailable by the traditional (prior art) rebate methods of FIG. 1 and FIG. 2.

In block 346, there may be follow up actions after the customer uses the rebate card to make a purchase. These follow up actions are similar to those of block 338 discussed above. One difference is that now a minimum of two transactions of data (first purchase, and then use of the rebate card) are now available for determining what follow up actions are desired. Another difference is that additional rebate value may be associated with the card based on criteria established by the retailer or manufacturer, such as the purchase of related products over time or, in the case of a server, ongoing customer tenure.

In block 348, the card may remain in regular use, the card may be lost, the card may be expire due to inactivity for perhaps a year, or the card may be zeroed and the account may be closed.

Figure 4:
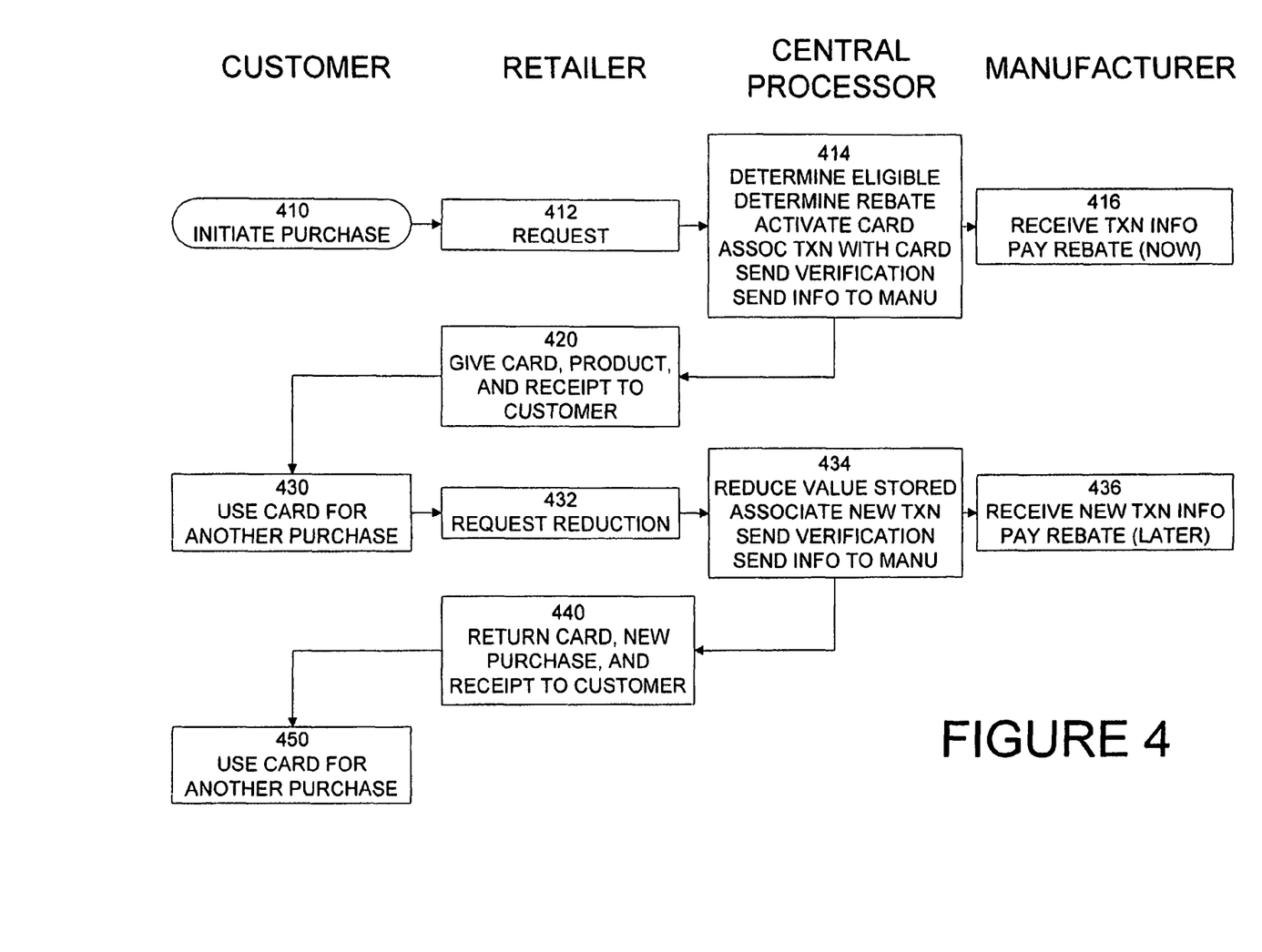
FIG. 4 displays some embodiments in accordance with the present invention where the final verification is performed by the central processor.

FIG. 4 displays an embodiment in accordance with the present invention, where the initial eligibility determination, and final verification may be performed by the central processor. The manufacturer may receive information about the transaction, and may pay the rebate ("now") during or soon after the initial purchase of rebate eligible product, or may pay the rebate ("later") during or soon after the use of the rebate card. The particular timing may vary. The manufacturer may pay the rebate directly to the central processor, or the retailer, or to a third party.

In block 410, the customer initiates the purchase of a potentially rebate eligible product at a POS (point of sale) of a retailer. This is the first purchase.

In block 412, the retailer sends a request to the central processor to evaluate the purchase and perform related activities.

In block 414, the central processor may: determine eligibility, determine rebate amount, determine whether purchaser has fulfilled required obligations, activate a card, associate purchase transaction information with the card, sends verification to the retailer, and send information to the manufacturer. There may be additional "handshaking" type communication with the retailer to verify that the card has actually been activated.

In block 416, the manufacturer may receive transaction information including customer information, and may pay the rebate "now" (immediately before the card is activated, immediately after the card is activated, or in a commercially reasonable time after the card is activated). The payment may be sent to a third party, and remain with the third party pending actual use of the card.

In block 420, the retailer may give the activated card, rebate-eligible product, and receipt to the customer.

In block 430, the customer may use the rebate card to make another purchase (second purchase).

In block 432, the retailer may request the central processor to reduce the value stored in or associated with the rebate card account. If the desired product price exceeds the present value of the rebate card, then the customer may be asked to make up the difference by using cash or credit. If the desired product price is less than the value of the rebate card, then some remaining value may be left on the rebate card, or the remaining value may be paid in cash and the rebate card zeroed or destroyed. Additionally, the retailer may request whether any products presently being purchased are eligible for rebates.

In block 434, the central processor may reduce or zero the value stored in or associated with the rebate card account, associate information from the new transaction with the rebate card account and/or with the prior rebate creating transaction, send verification to the retailer, and send information to the manufacturer. Additionally, the central processor may determine eligibility of the new products being purchased for additional rebates, or associate additional value to the card based on specific criteria established by the retailer or manufacturer (such as customer tenure with a related service, or purchase of related products).

In block 436, the manufacturer may receive transaction information regarding the use of the rebate card, and may pay the rebate during or soon after the use of the rebate card ("later"). The manufacturer may pay the full value of the rebate card, or the value of the purchase using the rebate card. The manufacturer may pay to the central processor, to the retailer, or to a third party. The manufacturer may pay immediately before the rebate card purchase is verified, or may pay immediately after the rebate purchase card is verified, or may pay within a commercially reasonable time of when the rebate card is used.

In block 440, the retailer returns the card (with a reduced value), the newly purchased product, and a receipt to the customer.

In block 450, the customer uses the card for another purchase (third purchase).

Figure 5:
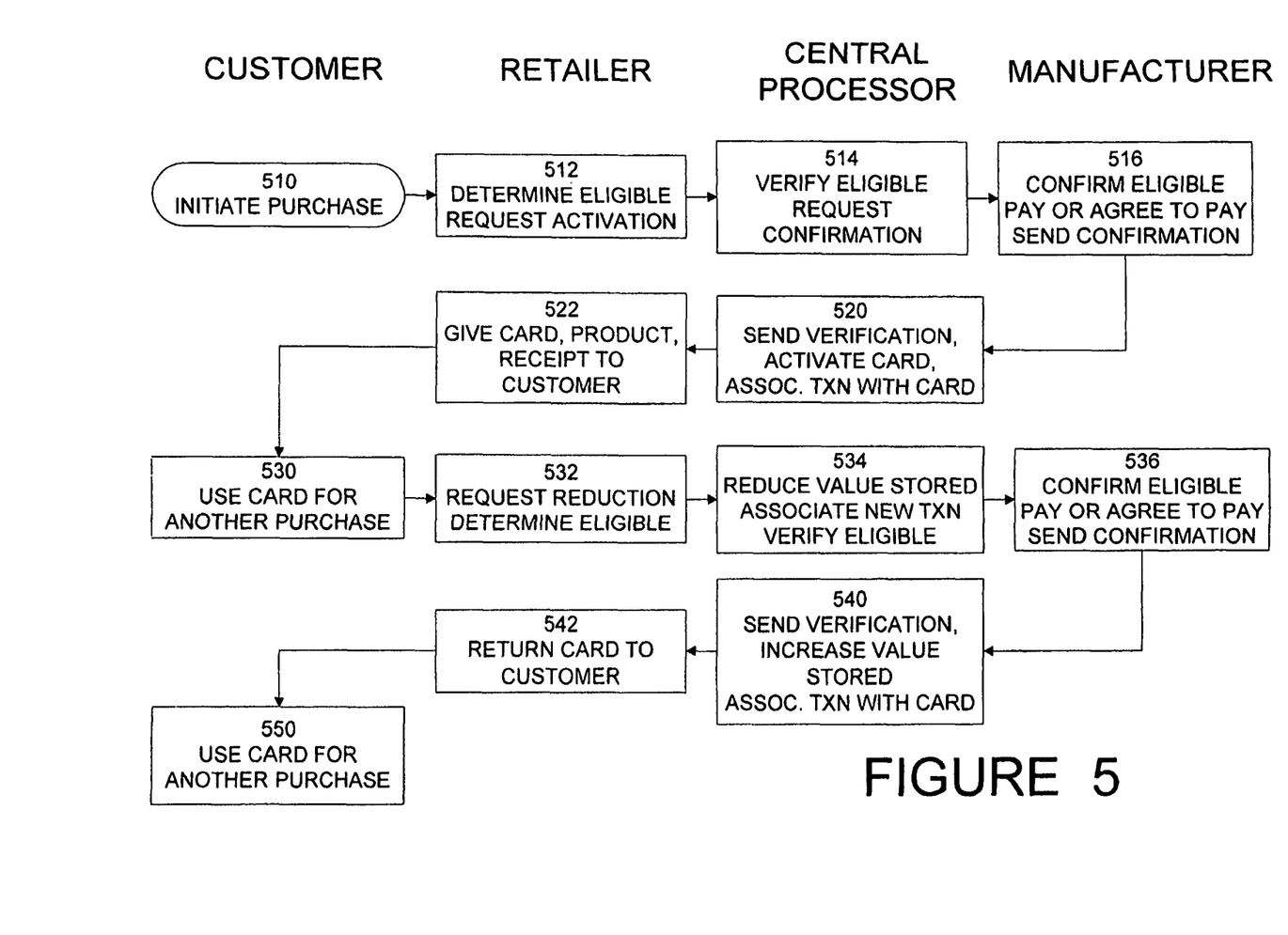
FIG. 5 displays some embodiments in accordance with the present invention where the manufacturer confirms the eligibility of the rebate before the card is activated.

FIG. 5 displays an embodiment in accordance with the present invention, where the retailer determines eligibility for a rebate, and the manufacturer and central processor confirm the eligibility of the rebate before the card is activated. In other respects it is similar to FIG. 4 discussed above.

In block 510, the customer initiates the purchase of a potentially rebate eligible product at a retailer POS. This is the first purchase.

In block 512, the retailer may make a preliminary determination of whether the product is eligible for a rebate, and send a request to the central processor to verify the eligibility and activate the card and perform related transactions.

In block 514, the central processor may verify eligibility based on several factors, and request confirmation from the manufacturer.

In block 516, the manufacturer may confirm eligibility, pay or agree to pay, and send confirmation. The manufacturer may pay the rebate "now" (immediately before the card is activated, immediately after the card is activated, or in a commercially reasonable time after the card is activated). The payment may be sent to a third party, and remain with the third party pending actual use of the card.

In block 520, the central processor may send verification, activate the card, and associate the transaction with the card account. Activation may be completed at the time of purchase, or subsequent to the purchase based on the purchaser having fulfilled specific requirements such as not returning a product, completion of a questionnaire or, in the case of a service, having installed the service and remained a customer for a specified period. There may be additional "handshaking" type communication with the retailer to verify that the card has actually been activated.

In block 522, the retailer may give the activated card, rebate-eligible product, and receipt to the customer.

In block 530, the customer may use the rebate card to make another purchase (second purchase).

In block 532, the retailer may request reduction of the amount associated with the rebate card, and determine eligibility of products being bought during the second purchase. If the desired product price exceeds the present value of the rebate card, then the customer may be asked to make up the difference by using cash or credit. If the desired product price is less than the value of the rebate card, then some remaining value may be left on the rebate card, or the remaining value may be paid in cash and the rebate card zeroed or destroyed.

In block 534, the central processor may reduce the value associated with the rebate card up to the amount of the new purchase, associate information regarding the new transaction with the card or prior transaction, verify eligibility of the new products for rebate, and increase the value associated with the rebate card if there are new rebates.

In block 536, the manufacturer may confirm that the new product is eligible, pay or agree to pay, and send confirmation. The payment may be sent to a third party and remain with the third party pending actual use of the card.

In block 540, the central processor may send verification to the retailer, increase the value stored on the card or associated with the card, and associate information from the second transaction with the card or with the first transaction or with the customer. The central processor may also associate additional value to the rebate card based on criteria not linked to a specific purchase at a retailer, such as tenure with a service provider or upgrade of a related service. This information may be shared with the manufacturer.

In block 542, the retailer may return the card to the customer, and the purchased product, and a receipt.

In block 550, the customer may use the card for another purchase (third purchase).

In some embodiments in accordance with the present invention, the rebate card system may comprise: initiating a purchase transaction by the customer for one or more products, determining eligibility of the purchase transaction for a rebate, determining the rebate amount, determining whether the purchaser has fulfilled related requirements, activating the card, and delivering the card to the customer as part of the purchase transaction.

Some embodiments in accordance with the present invention, may further comprise one or more of the following: the customer is physically present at the location of the purchase transaction, the customer is not physically present at the location of the purchase transaction, determining the eligibility of the purchase transaction for a rebate is determined at the location of the purchase transaction, determining the eligibility of the purchase transaction for a rebate is determined at a central processor, determining the eligibility of the purchase transaction for a rebate is determined at the location of the purchase transaction, and is verified by the central processor, and is verified by the manufacturer, determining the rebate value based on the identity a specific product, determining the rebate value based on the identities of a combination of products, determining the rebate value based on the total value of products from a single manufacturer, determining the rebate value based on the total value of all products, activating the card by associating a rebate value with an account that is associated with the card, associating purchase transaction information with the account that is associated with the card, transmitting associated purchase transaction information to the manufacturer, delivering the card to the customer as part of the purchase transaction by physically handing the card to the customer at the location of the purchase transaction, delivering the card to the customer as part of the purchase transaction by shipping the card to the customer with the purchased products, managing the card value based on the purchaser fulfilling certain requirements defined by the retailer and manufacturer, using the rebate card for a second purchase transaction, and reducing the value associated with the rebate card, associating the second purchase transaction information with the previous purchase transaction information, transmitting the associated second purchase transaction information to the manufacturer, analyzing the associated second purchase transaction information, associating additional value based on factors other than subsequent product purchases, and marketing to the customer or other potential customers based on the analysis.

In some embodiments in accordance with the present invention, the rebate card system may comprise: initiating an initial purchase transaction by the customer for one or more products at a retailer location, determining rebate eligibility of the purchase transaction by the retailer, determining the rebate amount by the retailer or by the central processor, sending an activation request from the retailer to the central processor, verifying by the central processor that the activation request is received from an authorized location, and that the product is eligible for rebate, communicating by the central processor to the manufacturer or retailer or rebate guarantor to confirm that the product is eligible for rebate, uniquely identifying the card, verification by the central processor that the purchaser has fulfilled defined requirements, activating the card by the central processor associating a rebate value with an account that is associated with the card, transmitting initial purchase transaction information and a request for payment to the manufacturer or retailer or other rebate guarantor, sending a verification message from the central processor to the retailer that the card has been activated, limiting the use of the card to purchases at the same retailer as the initial purchase, decreasing the value associated with the card when the card is used to make additional purchases, increasing the value associated with the card when additional purchase eligible products are purchased or the customer fulfills additional requirements, associating transaction information from the additional purchases or other factors with the transaction information from the initial purchase, transmitting the associated additional purchase transaction information to the manufacturer, or retailer, or rebate guarantor.

In some embodiments in accordance with the present invention, the purchaser of a rebate-eligible product may be provided a rebate card by the retailer. The rebate eligible product may be goods and/or services. The rebate may be from one or more of a manufacturer, a service provider, or the retailer. The rebate card may be associated with an account, and the account may be associated with a rebate value. Activation of the rebate card may be governed by the purchaser having fulfilled required commitments, such as not returning the product for a specified period or by purchasing a related product or service. The value associated to the rebate card may be fixed, or may vary based on criteria that the retailer or manufacturer may define. The rebate value may be decreased when the rebate card is used for additional purchases, and may be increased if additional rebates are earned. The initial purchase transaction information may be associated with the account, and shared with the manufacturer or service provider. Later purchase transaction information may be associated with the account, and shared with the manufacturer or service provider.

In some embodiments in accordance with the present invention, multiple rebates may be added on the same rebate card, and rebates from different merchants may be loaded on the rebate card at different points of sale. It is contemplated that value on the rebate card could be used to purchase a rebate eligible product, therefore putting additional rebate value on the same rebate card. It is contemplated that values on multiple rebate cards may be aggregated and loaded onto a single rebate card. It is contemplated that the rebate card value can be used to purchase additional goods or services, in physical stores or in interne accessible on-line storefronts. It is further contemplated that the rebate card value may be used to credit various other accounts, including but not limited to prepaid phone accounts and other prepaid accounts.

The systems and methods, as disclosed herein, are directed to the problems stated above, as well as other problems that are present in conventional techniques. Any description of various products, methods, or apparatus and their attendant disadvantages described in the "Background of the Invention" is in no way intended to limit the scope of the invention, or to imply that invention does not include some or all of the various elements of known products, methods and apparatus in one form or another. Indeed, various embodiments of the invention may be capable of overcoming some of the disadvantages noted in the "Background of the Invention," while still retaining some or all of the various elements of known products, methods, and apparatus in one form or another.

The present invention is not to be limited in scope by the specific exemplary embodiments described herein. Indeed, various modifications of the present invention, in addition to those described herein, will be apparent to those of ordinary skill in the art from the foregoing description and accompanying drawings. For example, various blocks shown in the figures may be omitted and/or may be re-ordered.

What is claimed is:

1. A method for using a rebate card with an identifier comprising:
   receiving a request to activate the rebate card at a central processor, the request received in response to a first purchase transaction for one or more products or services eligible for a rebate;
   activating the rebate card by associating a rebate value in a rebate card account associated with the rebate card;
   determining if one or more of the products or services eligible for a rebate have been returned or cancelled and responsive to a determination that one or more of the products or services eligible for a rebate have not been returned or cancelled, activating the rebate value associated with the rebate card at the central processor thereby making the rebate value in the rebate card account available for use.

2. The method of claim 1, further comprising the steps of:
   receiving a request to apply funds from the rebate account to a second purchase transaction; and
   reducing a balance of the rebate card account by an amount applied to the second purchase transaction.

3. The method of claim 2, wherein the funds from the rebate account will only be applied to the second purchase transaction if the second purchase transaction take place at a particular retailer.

4. The method of claim 3, wherein the particular retailer was a party to the first purchase transaction.

5. The method of claim 2, wherein the funds from the rebate account will only be applied to the second purchase transaction if the second purchase transaction is from a particular manufacturer or service provider.

6. The method of claim 2, further comprising:
   associating information from the second purchase transaction with the previous purchase transaction information.

7. The method of claim 1, further comprising:
   delivering the rebate card to the customer as part of the purchase transaction by physically delivering the rebate card to the customer at the location of the purchase transaction.

8. The method of claim 1, further comprising:
   delivering the rebate card to the customer as part of the purchase transaction by shipping the rebate card to the customer with one or more products purchased during the purchase transaction.

9. The method of claim 1, further comprising:
   determining whether the purchase transaction qualifies for a rebate at a location where the purchase transaction takes place.

10. The method of claim 1, further comprising:
    associating purchase transaction information with the rebate account.

11. The method of claim 10, further comprising:
    transmitting the associated purchase transaction information to a manufacturer of the one or more products.

* * * * *